United States Patent
Luan et al.

(10) Patent No.: US 11,971,699 B2
(45) Date of Patent: Apr. 30, 2024

(54) THERMAL MAPPING

(71) Applicant: Hewlett-Packard Development Company, L.P., Spring, TX (US)

(72) Inventors: He Luan, Palo Alto, CA (US); Jun Zeng, Palo Alto, CA (US)

(73) Assignee: Hewlett-Packard Development Company, L.P., Spring, CA (US)

(*) Notice: Subject to any disclaimer, the term of this patent is extended or adjusted under 35 U.S.C. 154(b) by 530 days.

(21) Appl. No.: 17/056,191

(22) PCT Filed: Oct. 29, 2018

(86) PCT No.: PCT/US2018/057979
§ 371 (c)(1),
(2) Date: Nov. 17, 2020

(87) PCT Pub. No.: WO2020/091724
PCT Pub. Date: May 7, 2020

(65) Prior Publication Data
US 2021/0247735 A1    Aug. 12, 2021

(51) Int. Cl.
| | |
|---|---|
| *G06T 3/4046* | (2024.01) |
| *B29C 64/393* | (2017.01) |
| *B33Y 30/00* | (2015.01) |
| *B33Y 50/02* | (2015.01) |
| *G05B 19/4099* | (2006.01) |
| *G06N 3/08* | (2023.01) |
| *G06T 3/4053* | (2024.01) |

(52) U.S. Cl.
CPC ........ *G05B 19/4099* (2013.01); *B29C 64/393* (2017.08); *B33Y 30/00* (2014.12); *B33Y 50/02* (2014.12); *G06N 3/08* (2013.01); *G06T 3/4046* (2013.01); *G06T 3/4053* (2013.01); *G05B 2219/49007* (2013.01); *G06T 2207/10048* (2013.01); *G06T 2207/20081* (2013.01); *G06T 2207/20084* (2013.01)

(58) Field of Classification Search
CPC ....... G06N 3/08; G06T 3/4046; G06T 3/4053; G06T 2207/10048; G06T 2207/20081; G06T 2207/20084; G06T 5/50; G06F 30/27; G06F 2113/10; G06F 2119/08
See application file for complete search history.

(56) References Cited

U.S. PATENT DOCUMENTS

| | | | |
|---|---|---|---|
| 6,815,636 B2 | 11/2004 | Chung et al. | |
| 10,814,558 B2 * | 10/2020 | Parangi | B29C 64/386 |

(Continued)

FOREIGN PATENT DOCUMENTS

| | | |
|---|---|---|
| CN | 1326403 A | 12/2001 |
| CN | 106855952 A | 6/2017 |

(Continued)

*Primary Examiner* — Phuoc Tran
(74) *Attorney, Agent, or Firm* — Shook, Hardy & Bacon L.L.P.

(57) ABSTRACT

Examples of methods for thermal mapping by an electronic device are described herein. In some examples, a map is obtained. In some examples, a first thermal image at a first resolution is obtained. In some examples, a neural network is used to determine a second thermal image at a second resolution based on the map and the first thermal image. The second resolution is greater than the first resolution in some examples.

14 Claims, 9 Drawing Sheets

(56) References Cited

U.S. PATENT DOCUMENTS

| | | | |
|---|---|---|---|
| 10,997,796 B2* | 5/2021 | Jaiswal | ............. G05B 13/0265 |
| 2015/0331402 A1 | 11/2015 | Lin et al. | |
| 2016/0148850 A1 | 5/2016 | David | |
| 2018/0104742 A1 | 4/2018 | Kottilingam et al. | |
| 2018/0169948 A1 | 6/2018 | Coeck et al. | |
| 2018/0178287 A1 | 6/2018 | Mamrak et al. | |

FOREIGN PATENT DOCUMENTS

| | | |
|---|---|---|
| CN | 107580545 A | 1/2018 |
| EP | 3684596 A1 | 7/2020 |
| WO | WO-2016168172 | 10/2016 |
| WO | WO-2016195665 A1 | 12/2016 |
| WO | WO-2017012663 | 1/2017 |
| WO | WO-2017194113 A1 | 11/2017 |
| WO | 2019/117886 A1 | 6/2019 |

* cited by examiner

THERMAL MAPPING

BACKGROUND

Three-dimensional (3D) solid parts may be produced from a digital model using additive manufacturing. Additive manufacturing may be used in rapid prototyping, mold generation, mold master generation, and short-run manufacturing. Additive manufacturing involves the application of successive layers of build material. This is unlike traditional machining processes that often remove material to create the final part. In some additive manufacturing techniques, the build material may be cured or fused.

DETAILED DESCRIPTION

Figure 1:
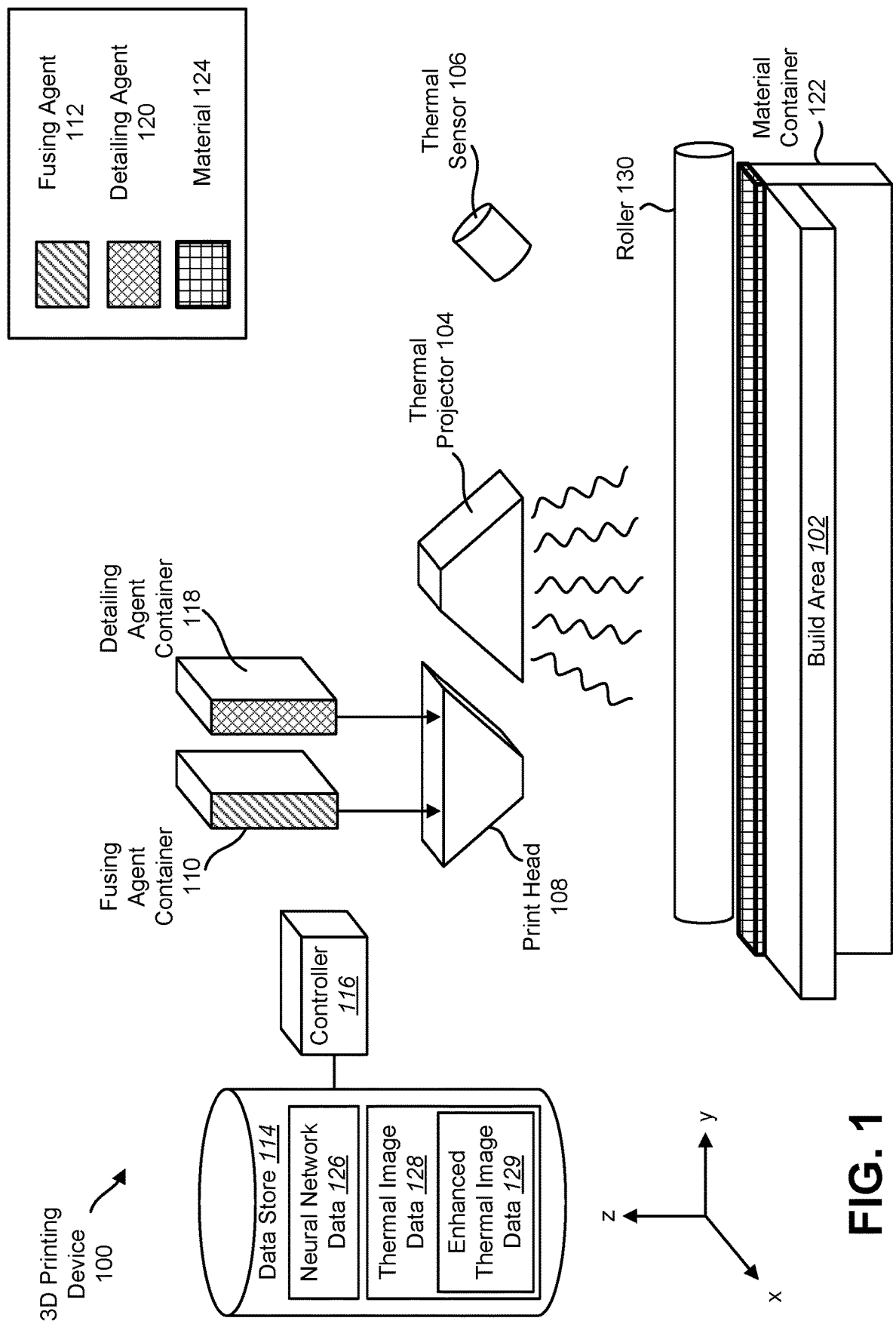
FIG. 1 is a simplified isometric view of an example of a three-dimensional (3D) printing device that may be used in an example of thermal mapping.

Additive manufacturing may be used to manufacture 3D objects. Three-dimensional (3D) printing is an example of additive manufacturing. Some examples of 3D printing may selectively deposit agents (e.g., droplets) at a pixel level to enable control over voxel-level energy deposition. For instance, thermal energy may be projected over material in a build area, where a phase change and solidification in the material may occur depending on the voxels where the agents are deposited.

Predicting transient thermal behavior with print process resolution (e.g., voxel-by-voxel in space and/or layer-by-layer in time) may be used to improve offline print tuning and/or online printing control. However, it is difficult to derive a quantitative model for predicting transient thermal behavior due to a lack of quantitative knowledge in terms of how material behaves.

Thermal behavior may be mapped as a thermal image. A thermal image is a set of data indicating temperature (or thermal energy) in an area. Thermal mapping includes obtaining (e.g., sensing and/or capturing) a thermal image or images and/or calculating (e.g., predicting) a thermal image or images. In some examples, a machine learning model (e.g., neural network or networks) may be used to calculate predicted thermal images. A predicted thermal image is a thermal image that is calculated using a machine learning model. For instance, the neural network or networks may utilize a contone map or maps (e.g., voxel-level machine instructions that dictate the placement, quantity, and/or timing of an agent or agents in a build area) and/or a thermal image or images to predict a thermal image.

A captured thermal image is a thermal image that is sensed or captured with a sensor. Sensors for capturing thermal images may be limited in resolution. For example, a built-in sensor in an additive manufacturing device may provide relatively low resolution (e.g., 31×30 pixels, 80×60 pixels, etc.) for online (e.g., run-time) thermal imaging. It may be beneficial to utilize a low-resolution thermal image sensor built-in to an additive manufacturing device due to the expense, size, and/or other considerations that may keep a high-resolution sensor from being utilized.

Low resolution thermal imaging may be inadequate to support voxel level thermal prediction in some approaches. For example, some approaches (e.g., some interpolation-based approaches, statistical approaches, and/or example-based approaches) for upscaling are inadequate to upscale the image resolution by a relatively large factor (e.g., 8, 20, etc.) accurately. For instance, some approaches may offer limited upscaling by a factor of 2 to 4 and may lack accuracy. Some of these approaches for increasing image resolution are based on visual spectrum images, and may involve a one-to-one mapping. Because fusing layer thermal behavior follows physical laws, there is additional potential for increasing the resolution of thermal images. However, many approaches are not designed for thermal images, and are not designed to leverage additional useful information and achieve physically consistent thermal sensing enhancement.

Some examples of the techniques described herein may include a deep neural network based practical model training approach that can achieve voxel-level thermal prediction with low-resolution thermal sensing and a contone map or maps as input. In some examples, thermal image prediction that is approximately 20 times the resolution of thermal sensing can be achieved (e.g., from 31×30 pixels or 80×60 pixels to 640×480 pixels). Missing details may be inferred from additional information (e.g., contone maps). Accordingly, some examples of the techniques described herein may significantly exceed other approaches. Some examples may enable online in-situ voxel-level thermal image prediction and/or online closed-loop feedback control.

It should be noted that while plastics may be utilized as a way to illustrate some of the approaches described herein, the techniques described herein may be applied to some examples of additive manufacturing. Some additive manufacturing techniques may be powder-based and driven by powder fusion. Some examples of the approaches described herein may be applied to powder bed fusion-based additive manufacturing, such as Selective Laser Melting (SLM), Selective Laser Sintering (SLS), etc. Some examples of the approaches described herein may be applied to additive manufacturing where agents carried by droplets are utilized for voxel-level thermal modulation. It should be noted that agents may or may not be utilized in some examples. It should also be noted that while some resolutions are described herein as examples, the techniques described herein may be applied for different resolutions.

As used herein, the term "voxel" and variations thereof may refer to a "thermal voxel." In some examples, the size of a thermal voxel may be defined as a minimum that is thermally meaningful (e.g., larger than 42 microns or 600 dots per inch (dpi)). An example of voxel size is 25.4 millimeters (mm)/150≈170 microns for 150 dots per inch (dpi). A maximum voxel size may be approximately 490 microns or 50 dpi. The term "voxel level" and variations thereof may refer to a resolution, scale, or density corresponding to voxel size. The term "low resolution" and variations thereof may refer to a resolution, scale, or density that is lower than that of a voxel level. For example, a low resolution is lower than a voxel-level resolution. Low-resolution thermal imaging may depend on the pixel resolution in a manufacturing device (e.g., machine, printer, etc.). For example, pixel size in low resolution thermal imaging may range from 11 mm to 37 mm. While an example of low-resolution size is given, other low-resolution sizes may be utilized.

Throughout the drawings, identical reference numbers may designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

FIG. 1 is a simplified isometric view of an example of a 3D printing device 100 that may be used in an example of thermal mapping. The 3D printing device 100 may include a controller 116, a data store 114, a build area 102, a print head 108, a fusing agent container 110, a detailing agent container 118, a roller 130, a material container 122, a thermal projector 104, and/or a thermal sensor 106. The example of a 3D printing device 100 in FIG. 1 may include additional components that are not shown, and some of the components described may be removed and/or modified without departing from the scope of the 3D printing device 100 in this disclosure. The components of the 3D printing device 100 may not be drawn to scale, and thus, may have a size and/or configuration different than what is shown.

In the example of FIG. 1, the 3D printing device 100 includes a fusing agent container 110, fusing agent 112, a detailing agent container 118, detailing agent 120, a material container 122, and material 124. In other examples, the 3D printing device 100 may include more or fewer containers, agents, hoppers, and/or materials. The material container 122 is a container that stores material 124 that may be applied (e.g., spread) onto the build area 102 by the roller 130 for 3D printing. The fusing agent container 110 is a container that stores a fusing agent 112. The fusing agent 112 is a substance (e.g., liquid, powder, etc.) that controls intake thermal intensity. For example, the fusing agent 112 may be selectively applied to cause applied material 124 to change phase with heat applied from the thermal projector 104 and/or to fuse with another layer of material 124. For instance, areas of material 124 where the fusing agent 112 has been applied may eventually solidify into the object being printed. The detailing agent 120 is a substance (e.g., liquid, powder, etc.) that controls outtake thermal intensity. For example, the detailing agent 120 may be selectively applied to detail edges of the object being printed.

The build area 102 is an area (e.g., surface) on which additive manufacturing may be performed. In some configurations, the build area 102 may be the base of a "build volume," which may include a volume above the base. As used herein, the term "build area" may refer to the base of a build volume and/or another portion (e.g., another plane above the base) of the build volume.

The roller 130 is a device for applying material 124 to the build area 102. In order to print a 3D object, the roller 130 may successively apply (e.g., spread) material 124 (e.g., a powder) and the print head 108 may successively apply and/or deliver fusing agent 112 and/or detailing agent 120. The thermal projector 104 is a device that delivers energy (e.g., thermal energy, heat, etc.) to the material 124, fusing agent 112, and/or detailing agent 120 in the build area 102. For example, fusing agent 112 may be applied on a material 124 layer where particles (of the material 124) are meant to fuse together. The detailing agent 120 may be applied to modify fusing and create fine detail and/or smooth surfaces. The areas exposed to energy (e.g., thermal energy from the thermal projector 104) and reactions between the agents (e.g., fusing agent 112 and detailing agent 120) and the material 124 may cause the material 124 to selectively fuse together to form the object.

The print head 108 is a device to apply a substance or substances (e.g., fusing agent 112 and/or detailing agent 120). The print head 108 may be, for instance, a thermal inkjet print head, a piezoelectric print head, etc. The print head 108 may include a nozzle or nozzles (not shown) through which the fusing agent 112 and/or detailing agent 120 are extruded. In some examples, the print head 108 may span a dimension of the build area 102. Although a single print head 108 is depicted, multiple print heads 108 may be used that span a dimension of the build area 102. Additionally, a print head or heads 108 may be positioned in a print bar or bars. The print head 108 may be attached to a carriage (not shown in FIG. 1). The carriage may move the print head 108 over the build area 102 in a dimension or dimensions.

The material 124 is a substance (e.g., powder) for manufacturing objects. The material 124 may be moved (e.g., scooped, lifted, and/or extruded, etc.) from the material container 122, and the roller 130 may apply (e.g., spread) the material 124 onto the build area 102 (on top of a current layer, for instance). In some examples, the roller 130 may span a dimension of the build area 102 (e.g., the same dimension as the print head 108 or a different dimension than the print head 108). Although a roller 130 is depicted, other means may be utilized to apply the material 124 to the build area 102. In some examples, the roller 130 may be attached to a carriage (not shown in FIG. 1). The carriage may move the roller 130 over the build area 102 in a dimension or dimensions. In some implementations, multiple material containers 122 may be utilized. For example, two material containers 122 may be implemented on opposite sides of the build area 102, which may allow material 124 to be spread by the roller 130 in two directions.

In some examples, the thermal projector 104 may span a dimension of the build area 102. Although one thermal projector 104 is depicted, multiple thermal projectors 104 may be used that span a dimension of the build area 102. Additionally, a thermal projector or projectors 104 may be positioned in a print bar or bars. The thermal projector 104 may be attached to a carriage (not shown in FIG. 1). The carriage may move the thermal projector 104 over the build area 102 in a dimension or dimensions.

In some examples, each of the print head 108, roller 130, and thermal projector 104 may be housed separately and/or may move independently. In some examples, two or more of the print head 108, roller 130, and thermal projector 104 may be housed together and/or may move together. In one example, the print head 108 and the thermal projector 104 may be housed in a print bar spanning one dimension of the build area 102, while the roller 130 may be housed in a carriage spanning another dimension of the build area 102. For instance, the roller 130 may apply a layer of material 124 in a pass over the build area 102, which may be followed by a pass or passes of the print head 108 and thermal projector 104 over the build area 102.

The controller 116 is a computing device, a semiconductor-based microprocessor, a Central Processing Unit (CPU), Graphics Processing Unit (GPU), Field-Programmable Gate Array (FPGA), an application-specific integrated circuit (ASIC), and/or other hardware device. The controller 116 may be connected to other components of the 3D printing device 100 via communication lines (not shown).

The controller 116 may control actuators (not shown) to control operations of the components of the 3D printing device 100. For example, the controller 116 may control an actuator or actuators that control movement of the print head 108 (along the x-, y-, and/or z-axes), actuator or actuators that control movement of the roller 130 (along the x-, y-, and/or z-axes), and/or actuator or actuators that control movement of the thermal projector 104 (along the x-, y-, and/or z-axes). The controller 116 may also control the actuator or actuators that control the amounts (e.g., proportions) of fusing agent 112 and/or detailing agent 120 to be deposited by the print head 108 from the fusing agent container 110 and/or detailing agent container 118. In some examples, the controller 116 may control an actuator or actuators that raise and lower build area 102 along the z-axis.

The controller 116 may communicate with a data store 114. The data store 114 may include machine-readable instructions that cause the controller 116 to control the supply of material 124, to control the supply of fusing agent 112 and/or detailing agent 120 to the print head 108, to control movement of the print head 108, to control movement of the roller 130, and/or to control movement of the thermal projector 104.

In some examples, the controller 116 may control the roller 130, the print head 108, and/or the thermal projector 104 to print a 3D object based on a 3D model. For instance, the controller 116 may utilize a contone map or maps that are based on the 3D model to control the print head 108. A contone map is a set of data indicating a location or locations (e.g., areas) for printing a substance (e.g., fusing agent 112 or detailing agent 120). In some examples, a contone map may include or indicate machine instructions (e.g., voxel-level machine instructions) for printing a substance. For example, a fusing agent contone map indicates coordinates and/or an amount for printing the fusing agent 112. In an example, a detailing agent contone map indicates coordinates and/or an amount for printing the detailing agent 120. In some examples, a contone map may correspond to a two-dimensional (2D) layer (e.g., 2D slice, 2D cross-section, etc.) of the 3D model. For instance, a 3D model may be processed to produce a plurality of contone maps corresponding to a plurality of layers of the 3D model. In some examples, a contone map may be expressed as a 2D grid of values, where each value may indicate whether to print an agent and/or an amount of agent at the location on the 2D grid. For instance, the location of a value in the 2D grid may correspond to a location in the build area 102 (e.g., a location (x, y) of a particular level (z) at or above the build area 102). In some examples, a contone map may be a compressed version of the aforementioned 2D grid or array (e.g., a quadtree).

The data store 114 is a machine-readable storage medium. Machine-readable storage is any electronic, magnetic, optical, or other physical storage device that stores executable instructions and/or data. A machine-readable storage medium may be, for example, Random Access Memory (RAM), an Electrically Erasable Programmable Read-Only Memory (EEPROM), a storage drive, an optical disc, and the like. A machine-readable storage medium may be encoded with executable instructions for controlling the 3D printing device 100. A computer-readable medium is an example of a machine-readable storage medium that is readable by a processor or computer.

The thermal sensor 106 is a device that senses or captures thermal data. The thermal sensor 106 may be integrated into, mounted in, and/or otherwise included in a machine (e.g., printer). In some examples, the thermal sensor 106 may capture thermal images of the build area 102. For instance, the thermal sensor 106 may be an infrared thermal sensor (e.g., camera) that captures thermal images of the build area 102 (e.g., applied material in the build area 102). In some examples, the thermal sensor 106 may capture thermal images during manufacturing (e.g., printing). For example, the thermal sensor 106 may capture thermal images online and/or in real-time.

A thermal image is a set of data indicating temperature (or thermal energy) in an area. A thermal image may be captured (e.g., sensed) from a thermal sensor 106 or may be calculated (e.g., predicted). For example, the thermal sensor 106 may capture a thermal image of a layer to produce a captured thermal image.

In some examples, a captured thermal image may be a two-dimensional (2D) grid of sensed temperatures (or thermal energy). In some examples, each location in the 2D grid may correspond to a location in the build area 102 (e.g., a location (x, y) of a particular level (z) at or above the build area 102). The thermal image or images may indicate thermal variation (e.g., temperature variation) over the build area 102. For example, thermal sensing over the build area 102 may indicate (e.g., capture and encapsulate) environmental complexity and heterogeneous thermal diffusivity. In some approaches, the thermal image or images may be transformed to align with a contone map or contone maps (e.g., registered with the contone map or maps).

In some examples, the controller 116 may receive a captured thermal image of a layer from the thermal sensor 106. For example, the controller 116 may command the thermal sensor 106 to capture a thermal image and/or may receive a captured thermal image from the thermal sensor 106. In some examples, the thermal sensor 106 may capture a thermal image for each layer of an object being manufactured. The captured thermal image is at a resolution. In some examples, the resolution of the captured thermal image is lower than a voxel-level resolution. For example, the resolution of the captured thermal image may be at a low-resolution. Examples of low-resolution include 31×30 pixels and 80×60 pixels. Each captured thermal image may be stored as thermal image data 128 in the data store 114.

In some examples, the data store 114 may store neural network data 126, thermal image data 128, and/or enhanced thermal image data 129. The neural network data 126 includes data defining a neural network or neural networks. For instance, the neural network data 126 may define a node or nodes, a connection or connections between nodes, a network layer or network layers, and/or a neural network or neural networks. Examples of neural networks include convolutional neural networks (CNNs) (e.g., basic CNN, deconvolutional neural network, inception module, residual neural network, etc.) and recurrent neural networks (RNNs) (e.g., basic RNN, multi-layer RNN, bi-directional RNN, fused RNN, clockwork RNN, etc.). Some approaches may utilize a variant or variants of RNN (e.g., Long Short Term Memory Unit (LSTM), peephole LSTM, no input gate (NIG), no forget gate (NFG), no output gate (NOG), no input activation function (NIAF), no output activation function (NOAF), no peepholes (NP), coupled input and forget gate (CIFG), full gate recurrence (FGR), gated recurrent unit (GRU), etc.). Different depths of a neural network or neural networks may be utilized.

In some examples, the controller 116 uses the neural network or networks (defined by the neural network data 126) to predict thermal images. For example, the controller 116 may calculate (e.g., predict), using a neural network or a plurality of neural networks, a predicted thermal image of a layer based on a captured thermal image or a plurality of captured thermal images and a contone map or a plurality of contone maps (e.g., a fusing contone map and a detailing contone map). The contone map or maps may be utilized as inputs to the neural network or networks. For instance, a voxel-level contone map or maps may be used in some approaches because the contone map or maps may enable voxel-level energy control and/or may provide information to increase the resolution of the predicted thermal image relative to the resolution of the captured thermal image.

The predicted thermal image is at a resolution. The resolution of the thermal image may be greater than the resolution of the captured thermal image. In some examples, the predicted thermal image is at a voxel-level resolution. An example of voxel-level resolution may be 640×480 pixels. The predicted thermal image or images may be stored in the data store 114 as enhanced thermal image data 129. The predicted thermal image or images may be "enhanced" in that the resolution of the predicted thermal image or images may be greater than the resolution of the captured thermal image or images. As used herein, the term "enhance" and variations thereof refer to increasing thermal image resolution using a neural network based on a contone map or maps.

Predicting, calculating, or computing the predicted thermal image may include calculating the predicted thermal image of the layer before, at, or after a time that the layer is formed. Accordingly, a thermal image for a layer may be "predicted" before, during, and/or after forming a layer. For example, a thermal image may be predicted for a layer that has not yet been applied and/or printed. Additionally or alternatively, thermal behavior (e.g., a thermal image) may be predicted for a layer at a time after application and/or printing. As used herein, the term "predict" and variants thereof may denote calculation with a machine learning model (e.g., neural network or networks). In some approaches, a predicted thermal image of a layer may be computed independently of capturing a thermal image of the layer.

In some examples, the predicted thermal image may correspond to a layer that is subsequent to a layer corresponding to the captured thermal image. For example, the captured thermal image may correspond to a previous layer k-1 and the predicted thermal image may correspond to a layer k. It should be noted that a number of captured thermal images of previous layers may also be utilized in the calculation in some examples. The contone map or maps may correspond to the same layer (e.g., layer k) as the layer corresponding to the predicted thermal image and/or to a previous layer or layers.

In some examples, the predicted thermal image may correspond to a layer that is the same as a layer corresponding to the captured thermal image. For example, the captured thermal image may correspond to a layer k and the predicted thermal image may correspond to the layer k. It should be noted that a number of captured thermal images of previous layers may also be utilized in the calculation in some examples. The contone map or maps may correspond to the same layer (e.g., layer k) as the layer corresponding to the predicted thermal image and/or to a previous layer or layers.

A contone map may be a representation of agent placement (e.g., placement and/or quantity for a fusing agent and/or placement and/or quantity for a detailing agent). While contone maps are given as examples of data input into the neural network or networks, other information or data may be utilized in addition to or alternatively from contone maps. For example, slices may be utilized to assist predicting thermal images and/or may be utilized as an alternative learning dataset. In particular, slices may be used instead of a contone map or contone maps or in addition to a contone map or contone maps in some examples.

It should be noted that other thermal images (e.g., voxel-level captured thermal images) may be utilized to train the neural network or networks in some examples. For instance, the controller 116 may compute a loss function based on the predicted thermal image and the thermal image. The neural network or networks may be trained based on the loss function.

In some examples, a neural network may include an input layer or layers, an encoder layer or layers, a spatiotemporal layer (e.g., RNN layer), a decoder layer or layers, and/or an output layer or layers. For example, next to the input layer, an encoder layer may extract features from inputs. The spatiotemporal layer may learn both sequential and spatial information from a contone map or maps and a captured thermal image or images (e.g., from real-time in-machine thermal sensing). The decoder layer may translate features into an output domain and may be situated before the output layer. Each layer may include a node or nodes (e.g., more than one node (or perceptron)) in some implementations. In some examples, a neural network may be connected to another neural network or networks, may include another neural network or networks, and/or may be merged (e.g., stacked) with another neural network or networks. In some examples, another neural network or networks may be utilized as an encoder or decoder. In some examples, multiple encoders or decoders may be utilized, or an encoder or decoder may not be implemented or utilized.

In some examples, the controller 116 may upscale the captured thermal image to produce an upscaled thermal image. As used herein, the term "upscaling" and variants thereof denote increasing a resolution of an image. Upscaling may not be based on a contone map and/or may not provide the accuracy of the thermal image enhancement described herein. Examples of upscaling may include interpolation-based approaches, statistical approaches, and/or example-based approaches. For instance, the controller 116 may perform bi-cubic interpolation to upscale the captured thermal image to produce the upscaled thermal image.

In some examples, upscaling the captured thermal image may include performing thermal prediction intensity correction as follows. Thermal prediction intensity correction is an empirical approach for thermal image resolution upscaling. This approach may utilize a simple model to upscale a thermal image of a layer (at 150 pixels per inch (ppi), for example). Examples of the simple thermal predictive model may include first-principle based models or empirical models. This thermal predictive model upscaling may not utilize a neural network and/or may not utilize a contone map or maps. The thermal image may be down-sampled into a same resolution as low-resolution thermal sensing (e.g., 42×30 pixels). Then, a ratio of measured to predicted temperature may be calculated. For example, an un-distorted infrared camera image (at a resolution of 42×30 pixels, for instance) may be utilized to calculate the ratio of measured to predicted temperatures. The camera image may be utilized to adjust the thermal image that was predicted based on the intensity correction derived from the measured infrared camera image. Interpolation may be utilized to up-sample the calculated ratio to the high resolution (e.g., 2496×1872 pixels or 150 ppi). The high-resolution thermal image may be derived by multiplying the high-resolution ratio by the original thermal image that was predicted.

While the thermal image is upscaled, the generated high-resolution image may show gradients due to interpolation. The enhancement result of the intensity correction may not be accurate enough for some applications. However, this approach may still provide a high-resolution thermal image, which may be utilized to reduce the difficulties in model-based image enhancement. For example, the thermal prediction intensity correction may be utilized in some examples of thermal image enhancement described herein. It should be noted that some examples of thermal image enhancement (e.g., modeling approaches) described herein is not limited to thermal prediction intensity correction. Some examples of thermal image enhancement may utilize any thermal sensing resolution upscaling results as model input. The model may learn how to correct the results during model training.

In some examples, the controller 116 may encode, using an encoder (e.g., a first convolutional neural network (CNN)), the upscaled thermal image to produce first data. The first data may include features of the upscaled thermal image. In some examples, the controller 116 may encode, using an encoder (e.g., a second convolutional neural network), the fusing contone map, and/or the detailing contone map to produce second data. The second data may include features of the fusing contone map and/or the detailing contone map. In some examples, the controller 116 may concatenate the first data with the second data to produce concatenated data. The concatenated data may be input to the neural network (e.g., the recurrent neural network (RNN)). In some examples, the controller 116 may decode, using a decoder (e.g., third convolutional neural network), an output of the neural network to produce the predicted thermal image (e.g., the enhanced thermal image).

In some examples, the encoder(s) and/or decoder may be convolutional neural networks, though it should be noted that the encoder(s) and/or decoder may not be convolutional neural networks in some approaches. For example, the encoder(s) and/or decoder may be convolutional neural networks combining different components, including convolutional layers, pooling layers, deconvolutional layers, inception layers, and/or residual layers, etc. The specific architecture should be tuned experimentally.

In some examples, the controller 116 may print a layer or layers based on the predicted thermal image. For instance, the controller 116 may control the amount and/or location of fusing agent 112 and/or detailing agent 120 for a layer based on the predicted thermal image. In some examples, the controller 116 may drive model setting (e.g., the size of the stride) based on the predicted thermal image (e.g., thermal diffusion). Additionally or alternatively, the controller 116 may perform offline print mode tuning based on the predicted thermal image. For example, if the predicted thermal image indicates systematic bias (e.g., a particular portion of the build area is consistently colder or warmer than baseline), the data pipeline may be altered such that the contone maps are modified to compensate for such systematic bias. For instance, if the predicted thermal image indicates a systematic bias, the controller 116 may adjust contone map generation (for a layer or layers, for example) to compensate for the bias. Accordingly, the location and/or amount of agent(s) deposited may be adjusted based on the contone map(s) to improve print accuracy and/or performance.

Figure 2:
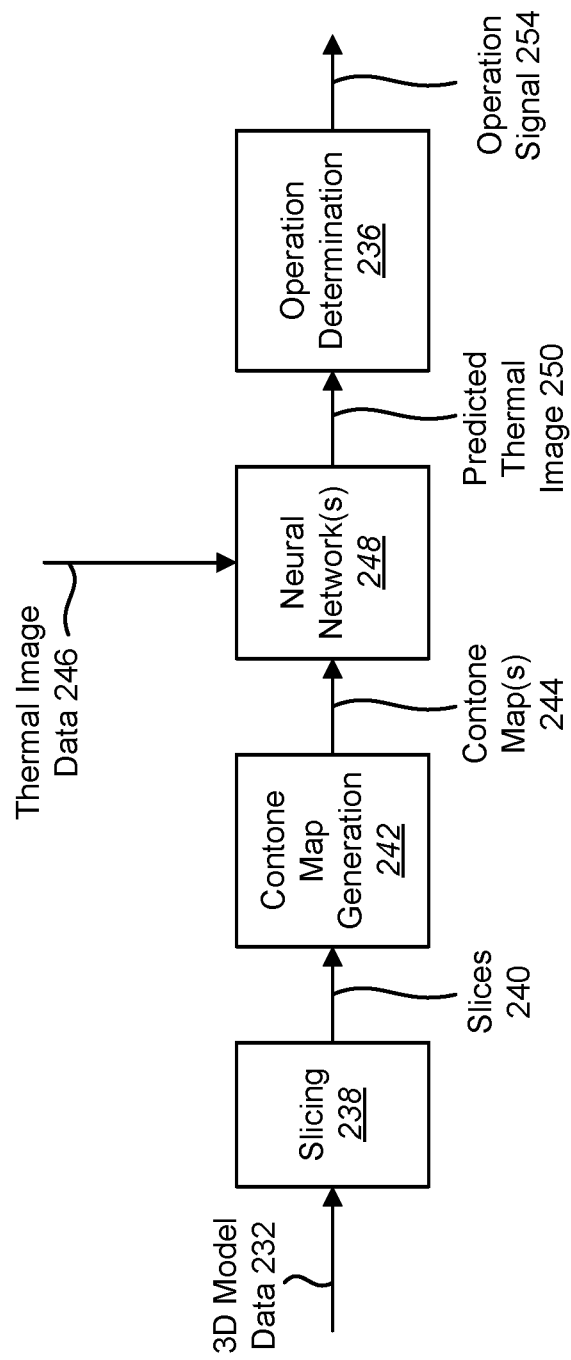
FIG. 2 is a block diagram illustrating examples of functions that may be implemented to perform thermal mapping.

FIG. 2 is a block diagram illustrating examples of functions that may be implemented to perform thermal mapping. In some examples, one, some, or all of the functions described in connection with FIG. 2 may be performed by the controller 116 described in connection with FIG. 1. For instance, instructions for slicing 238, contone map generation 242, neural network or networks 248, and/or operation determination 236 may be stored in the data store 114 and executed by the controller 116 in some examples. In other examples, a function or functions (e.g., slicing 238, contone map generation 242, neural network or networks 248, and/or operation determination 236) may be performed by another apparatus. For instance, slicing 238 may be carried out on a separate apparatus and sent to the 3D printing device 100.

3D model data 232 may be obtained. For example, the 3D model data 232 may be received from another device and/or generated. The 3D model data 232 may specify shape and/or size of a 3D model for printing a 3D object. 3D model data 232 can define both the internal and the external portion of the 3D object. The 3D model data 232 can be defined, for example, using polygon meshes. For example, the 3D model data 232 can be defined using a number of formats such as a 3MF file format, an object (OBJ) file format, and/or a stereolithography (STL) file format, among other type of files formats.

Slicing 238 may be performed based on the 3D model data 232. For example, slicing 238 may include generating a set of 2D slices 240 corresponding to the 3D model data 232. In some approaches, the 3D model indicated by the 3D model data 232 may be traversed along an axis (e.g., a vertical axis, z-axis, or other axis), where each slice 240 represents a 2D cross section of the 3D model. For example, slicing 238 the 3D model can include identifying a z-coordinate of a slice plane. The z-coordinate of the slice plane can be used to traverse the 3D model to identify a portion or portions of the 3D model intercepted by the slice plane.

A 3D model and/or stack of 2D slices (e.g., vector slices) may be utilized to generate per-layer machine instructions (e.g., voxel-level agent distribution) by accounting for process physics. Contone maps may be examples of per-layer machine instructions. In some examples, contone map generation 242 may be performed based on the slices 240. For example, a contone map or contone maps 244 may be generated 242 for each slice 240. For instance, contone map generation 242 may include generating a fusing contone map and a detailing contone map, where the fusing contone map indicates an area or areas and density distribution for printing fusing agent for a layer. The detailing contone map indicates an area or areas and density distribution for printing detailing agent for the layer. The contone map or maps 244 may be represented in a variety of file formats in some examples. For instance, a contone map 244 may be formatted as a BKZ contone file, a SIF contone file, and/or another kind of contone file.

The neural network or networks 248 may be used to calculate (e.g., predict) a predicted thermal image 250 (e.g., enhanced thermal image) based on the contone map or maps 244 and thermal image data 246 from the same layer and/or a previous layer or layers. The thermal image data 246 may represent a thermal image or images at a first resolution (e.g., 31×30 pixels or 80×60 pixels). The predicted thermal image 250 may be at a second resolution (e.g., 640×480 pixels).

Operation determination 236 may be performed based on the predicted thermal image 250. For example, the operation determination 236 may produce an operation signal 254 indicating control information. The control information may be utilized to print a layer or layers based on the predicted thermal image 250. For instance, the operation signal 254 may indicate controlling the amount and/or location of fusing agent and/or detailing agent for a layer based on the predicted thermal image 250. In some examples, the operation signal 254 may drive model setting (e.g., the size of the stride) based on the predicted thermal image 250 (e.g., thermal diffusion). Additionally or alternatively, the operation signal 254 may indicate offline print mode tuning based on the predicted thermal image 250. For example, if the predicted thermal image 250 indicates systematic bias (e.g., a particular portion of the build area is consistently colder or warmer than baseline), the data pipeline may be altered such that the contone maps are modified to compensate for such systematic bias. For instance, if the predicted thermal image 250 indicates a systematic bias, the operation signal 254 may indicate an adjustment to contone map generation (for a layer or layers, for example) to compensate for the bias. Accordingly, the location and/or amount of agent(s) deposited may be adjusted based on the contone map(s) to improve print accuracy and/or performance. In some examples, performing an operation may include presenting the thermal image(s) (e.g., predicted thermal image) on a display and/or sending the thermal image(s) (e.g., predicted thermal image(s)) to another device.

Figure 3:
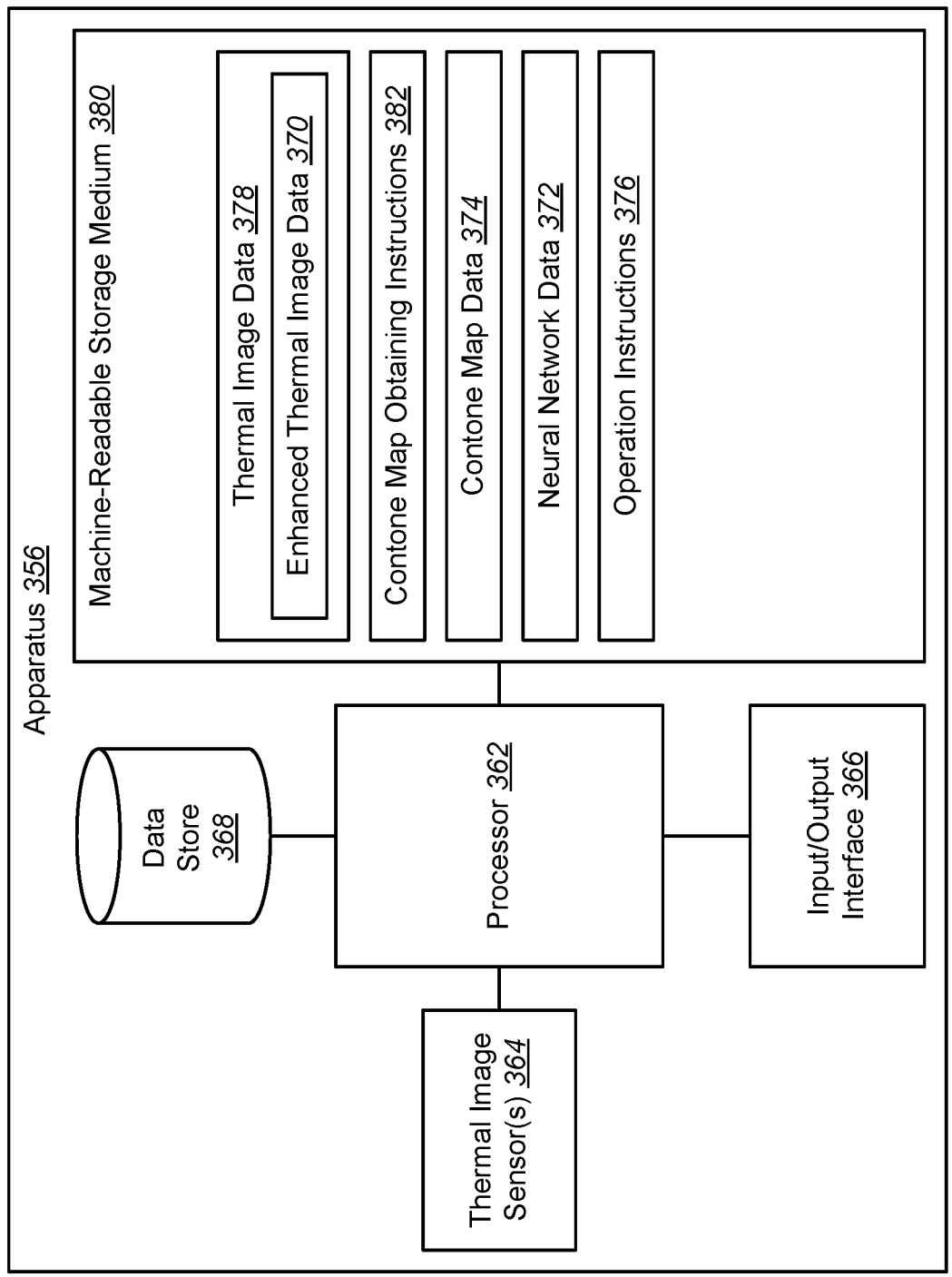
FIG. 3 is a block diagram of an example of an apparatus that may be used in thermal mapping.

FIG. 3 is a block diagram of an example of an apparatus 356 that may be used in thermal mapping. The apparatus 356 may be a computing device, such as a personal computer, a server computer, a printer, a 3D printer, a smartphone, a tablet computer, etc. The apparatus 356 may include and/or may be coupled to a processor 362, a data store 368, an input/output interface 366, a machine-readable storage medium 380, and/or a thermal image sensor or sensors 364. In some examples, the apparatus 356 may be in communication with (e.g., coupled to, have a communication link with) an additive manufacturing device (e.g., the 3D printing device 100 described in connection with FIG. 1). Alternatively, the apparatus 356 may be an example of the 3D printing device 100 described in connection with FIG. 1. For instance, the processor 362 may be an example of the controller 116 described in connection with FIG. 1, the data store 368 may be an example of the data store 114 described in connection with FIG. 1, and the thermal image sensor or sensors 364 may be an example of the thermal sensor 106 described in connection with FIG. 1. The apparatus 356 may include additional components (not shown) and/or some of the components described herein may be removed and/or modified without departing from the scope of this disclosure.

The processor 362 may be any of a central processing unit (CPU), a semiconductor-based microprocessor, graphics processing unit (GPU), FPGA, an application-specific integrated circuit (ASIC), and/or other hardware device suitable for retrieval and execution of instructions stored in the machine-readable storage medium 380. The processor 362 may fetch, decode, and/or execute instructions (e.g., operation instructions 376) stored on the machine-readable storage medium 380. Additionally or alternatively, the processor 362 may include an electronic circuit or circuits that include electronic components for performing a functionality or functionalities of the instructions (e.g., operation instructions 376). In some examples, the processor 362 may be configured to perform one, some, or all of the functions, operations, steps, methods, etc., described in connection with one, some, or all of FIGS. 1-2 and/or 4-9.

The machine-readable storage medium 380 may be any electronic, magnetic, optical, or other physical storage device that contains or stores electronic information (e.g., instructions and/or data). Thus, the machine-readable storage medium 380 may be, for example, Random Access Memory (RAM), Electrically Erasable Programmable Read-Only Memory (EEPROM), a storage device, an optical disc, and the like. In some implementations, the machine-readable storage medium 380 may be a non-transitory tangible machine-readable storage medium, where the term "non-transitory" does not encompass transitory propagating signals.

The apparatus 356 may also include a data store 368 on which the processor 362 may store information. The data store 368 may be volatile and/or non-volatile memory, such as Dynamic Random Access Memory (DRAM), EEPROM, magnetoresistive random-access memory (MRAM), phase change RAM (PCRAM), memristor, flash memory, and the like. In some examples, the machine-readable storage medium 380 may be included in the data store 368. Alternatively, the machine-readable storage medium 380 may be separate from the data store 368. In some approaches, the data store 368 may store similar instructions and/or data as that stored by the machine-readable storage medium 380. For example, the data store 368 may be non-volatile memory and the machine-readable storage medium 380 may be volatile memory.

The apparatus 356 may further include an input/output interface 366 through which the processor 362 may communicate with an external device or devices (not shown), for instance, to receive and store the information pertaining to the object or objects to be manufactured (e.g., printed). The input/output interface 366 may include hardware and/or machine-readable instructions to enable the processor 362 to communicate with the external device or devices. The input/output interface 366 may enable a wired or wireless connection to the external device or devices. The input/output interface 366 may further include a network interface card and/or may also include hardware and/or machine-readable instructions to enable the processor 362 to communicate with various input and/or output devices, such as a keyboard, a mouse, a display, another apparatus, electronic device, computing device, etc., through which a user may input instructions into the apparatus 356.

In some examples, the machine-readable storage medium 380 may store thermal image data 378. The thermal image data 378 may be obtained (e.g., received) from a thermal image sensor or sensors 364 and/or may be predicted. For example, the processor 362 may execute instructions (not shown in FIG. 3) to obtain a captured thermal image or images for a layer or layers. In some examples, the apparatus 356 may include a thermal image sensor or sensors 364, may be coupled to a remote thermal image sensor or sensors, and/or may receive thermal image data 378 (e.g., a thermal image or images) from a (integrated and/or remote) thermal image sensor. Some examples of thermal image sensors 364 include thermal cameras (e.g., infrared cameras). Other kinds of thermal sensors may be utilized. In some examples, thermal sensor resolution may be less than voxel resolution (e.g., each temperature readout may cover an area that includes multiple voxels). For example, a low-resolution thermal camera with a low-resolution (e.g., 31×30 pixels, 80×60 pixels, etc.) may be utilized. In other examples, a high-resolution thermal image sensor or sensors 364 may provide voxel-level (or near voxel-level) thermal sensing (e.g., 640×480 pixels) for neural network training.

The thermal image data 378 may include a thermal image or images. As described above, a thermal image may be an image that indicates heat (e.g., temperature) over an area and/or volume. For example, a thermal image may indicate a build area temperature distribution (e.g., thermal temperature distribution over a top layer). In some examples, the thermal image sensor or sensors 364 may undergo a calibration procedure to overcome distortion introduced by the thermal image sensor or sensors 364. For example, a thermal image may be transformed to register the thermal image with the contone map or maps. Different types of thermal sensing devices may be used in different examples.

In some examples, the processor 362 may execute contone map obtaining instructions 382 to obtain contone map data 374. For example, the contone map obtaining instructions 382 may generate a contone map or maps (e.g., from slice data and/or 3D model data) and/or may receive a contone map or maps from another device (via the input/output interface 366, for example). The contone map data 374 may indicate agent distribution (e.g., fusing agent distribution and/or detailing agent distribution) at the voxel level for printing a 3D object. For instance, the contone map data 374 may be utilized as per-layer machine instructions (e.g., voxel-level machine instructions) for agent distribution.

It should be noted that multiple different agent contone maps corresponding to different abilities to absorb or remove thermal energies may be utilized in some examples. Additionally or alternatively, some examples may utilize different print modes where multiple contone maps may be used for each agent.

For a given layer (e.g., a current layer, a top layer, etc.), the contone map or maps of all agents deposited to the layer may be an energy driving force in some examples. It should be noted that another voxel-level energy influencer may include neighboring voxels in previous layers that may have a temperature differential compared to a given voxel, which may induce heat flux into or out of the voxel.

The machine-readable storage medium 380 may store neural network data 372. The neural network data 372 may include data defining and/or implementing a neural network or neural networks. For instance, the neural network data 372 may define a node or nodes, a connection or connections between nodes, a network layer or network layers, and/or a neural network or neural networks. In some examples, the processor 362 may utilize (e.g., execute instructions included in) the neural network data 372 to calculate predicted thermal images. A predicted thermal image or images may be stored as enhanced thermal image data 370 on the machine-readable storage medium 380.

In some examples, the processor 362 uses the neural network or networks (defined by the neural network data 372) to enhance the captured thermal image or images. For example, the processor 362 may enhance the captured thermal image using a neural network or networks based on the contone map or maps to produce an enhanced thermal image or images. The enhanced thermal image(s) may have an increased resolution relative to a resolution of the captured thermal image(s). The enhanced thermal image or images may be stored as enhanced thermal image data 370. For instance, the processor 362 may calculate (e.g., predict), using a neural network or a plurality of neural networks, a predicted thermal image of a layer based on a captured thermal image or a plurality of captured thermal images and a contone map or a plurality of contone maps (e.g., a fusing contone map and a detailing contone map).

Enhancing a captured thermal image (e.g., predicting, calculating, or computing the predicted thermal image) may include calculating the enhanced thermal image of the layer before, at, or after a time that the layer is formed. In some examples, the enhanced thermal image may correspond to a layer that is subsequent to a layer corresponding to the captured thermal image. For example, the captured thermal image may correspond to a previous layer k-1 and the enhanced thermal image may correspond to a layer k. It should be noted that a number of captured thermal images of previous layers may also be utilized in the calculation in some examples. The contone map or maps may correspond to the same layer (e.g., layer k) as the layer corresponding to the enhanced thermal image and/or to a previous layer or layers.

In some examples, the enhanced thermal image may correspond to a layer that is the same as a layer corresponding to the captured thermal image. For example, the captured thermal image may correspond to a layer k and the enhanced thermal image may correspond to the layer k. It should be noted that a number of captured thermal images of previous layers may also be utilized in the calculation in some examples. The contone map or maps may correspond to the same layer (e.g., layer k) as the layer corresponding to the enhanced thermal image and/or to a previous layer or layers.

In some examples, the processor 362 may execute the operation instructions 376 to perform an operation based on the enhanced thermal image. For example, the processor 362 may print (e.g., control amount and/or location of agent(s) for) a layer or layers based on the predicted thermal image 250. In some examples, the processor 362 may drive model setting (e.g., the size of the stride) based on the enhanced thermal image. Additionally or alternatively, the processor 362 may perform offline print mode tuning based on the enhanced thermal image. Additionally or alternatively, the processor 362 may send a message (e.g., alert, alarm, progress report, quality rating, etc.) based on the enhanced thermal image. Additionally or alternatively, the processor 362 may halt printing in a case that the enhanced thermal image indicates a problem (e.g., more than a threshold difference between a layer or layers of printing and the 3D model and/or slices). Additionally or alternatively, the processor 362 may feed the predicted thermal image for the upcoming layer to a thermal feedback control system to online compensate the contone maps for the upcoming layer.

Examples of the techniques described herein may utilize a deep neural network based practical model training approach. The approach can achieve voxel level thermal prediction with built-in low-resolution thermal sensing and contone maps as input. The approach can achieve the prediction that is approximately 20 times the resolution of built-in thermal sensing. This approach may enable real-time in-situ voxel-level thermal image prediction and feedback control. For example, the neural network architecture may enable the real-time in-situ fusing layer thermal prediction with print resolution and/or online closed-loop thermal feedback control. Some examples of the techniques described here may enable additive manufacturing devices to provide built-in online voxel-level high-resolution thermal sensing.

Some examples of the techniques described herein may utilize a neural network architecture based approach that accounts for different thermal drivers to predict the voxel level high-resolution thermal behavior from low-resolution thermal sensing and voxel-level agent contone maps. Some examples may infer the missing details from additional information and achieve high-resolution thermal prediction.

Some examples of the techniques described herein may provide voxel-level fusing layer thermal prediction (e.g., future thermal image prediction) using built-in low-resolution thermal sensors. In some examples, performing the operation may include using the thermal prediction to serve as an online thermal prediction engine to enable voxel-level thermal feedback control. For example, the processor 362 may perform feedback control by controlling the printing process and/or the machine instructions. Additionally or alternatively, processor 362 may utilize the thermal prediction to serve as a prediction engine (e.g., online and/or offline) for a variety of 3D printer based analysis, monitoring, diagnosis, and/or control, etc. Additionally or alternatively, processor 362 may utilize the thermal prediction to serve as an offline simulation tool for thermal behavior prediction, visualization, and/or quantification, etc.

In some examples, a neural network may be utilized to predict a thermal image of the same layer as the layer of the captured thermal image. For example, a low-resolution captured thermal image may be utilized to produce an enhanced voxel-level resolution thermal image. Some examples may be utilized online and/or offline to provide voxel-level thermal image sensing. The voxel-level (e.g., high-accuracy) thermal sensing may be used in modeling, machine behavior analysis, and/or thermal analysis, etc.

In some examples, the machine-readable storage medium 380 may store 3D model data (not shown in FIG. 3). The 3D model data may be generated by the apparatus 356 and/or received from another device. In some examples, the machine-readable storage medium 380 may include slicing instructions (not shown in FIG. 3). For example, the processor 362 may execute the slicing instructions to perform slicing on the 3D model data to produce a stack of 2D vector slices.

In some examples, the operation instructions 376 may include 3D printing instructions. For instance, the processor 362 may execute the 3D printing instructions to print a 3D object or objects. In some implementations, the 3D printing instructions may include instructions for controlling a device or devices (e.g., rollers, print heads, and/or thermal projectors, etc.). For example, the 3D printing instructions may use a contone map or contone maps (stored as contone map data, for instance) to control a print head or heads to print an agent or agents in a location or locations specified by the contone map or maps. In some examples, the processor 362 may execute the 3D printing instructions to print a layer or layers. The printing (e.g., thermal projector control) may be based on thermal images (e.g., captured thermal images and/or predicted thermal images).

In some examples, the machine-readable storage medium 380 may store neural network training instructions. The processor 362 may execute the neural network training instructions to train a neural network or neural networks (defined by the neural network data 372, for instance). In some examples, the processor 362 may train the neural network or networks using a set of training thermal images. The set of training thermal images may have a resolution that is greater than the resolution of a captured thermal image (e.g., anticipated captured thermal image at run-time). For example, a training thermal sensor may have a voxel-level resolution for training. The training thermal sensor may capture the set of training thermal images. In some examples, the training thermal sensor may be placed outside of an additive manufacturing device (e.g., printer). In some approaches, the neural network training instructions may include a loss function. The processor 362 may compute the loss function based on a predicted thermal image and a training thermal image. For example, the training thermal image may provide the ground truth (which may or may not be at voxel-level) for the loss function. The loss function may be utilized to train a neural network or neural networks. For example, a node or nodes and/or a connection weight or weights in the neural network or networks may be adjusted based on the loss function in order to improve the prediction accuracy of the neural network or networks. It should be noted that not all of the steps and/or features described in connection with FIG. 3 may be required in all implementations.

Figure 4:
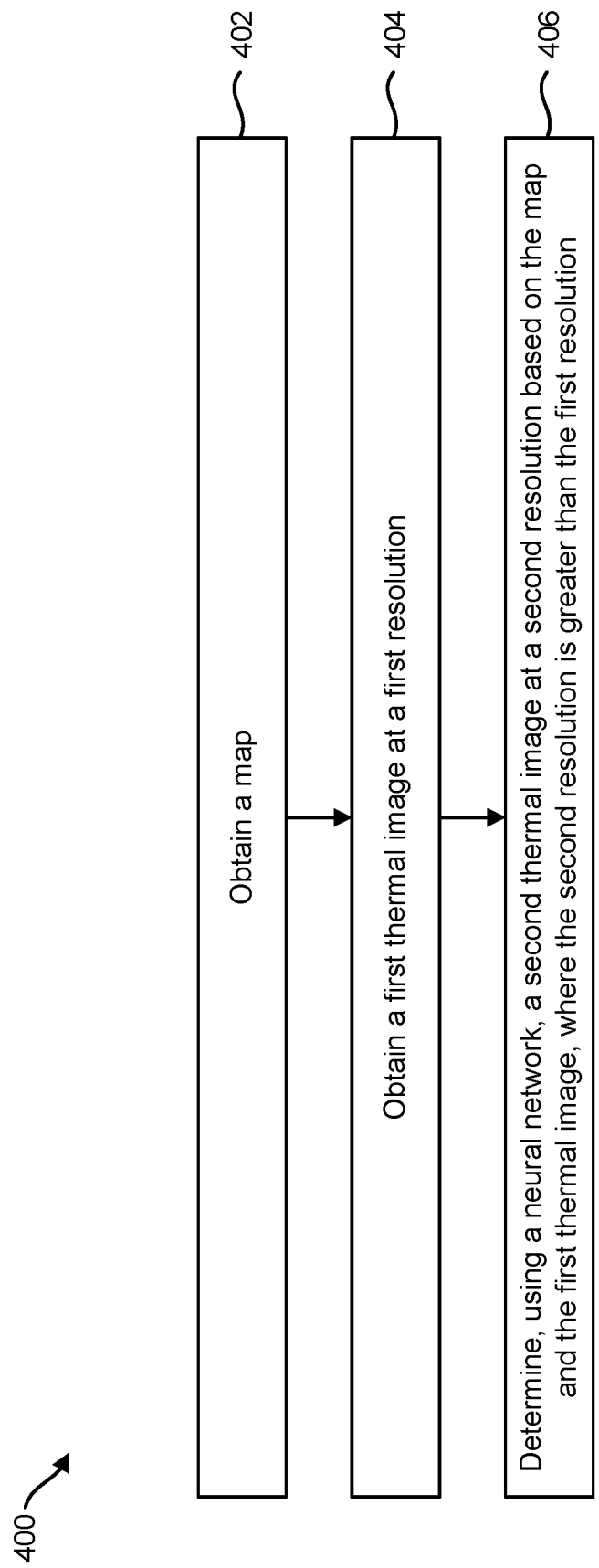
FIG. 4 is a flow diagram illustrating an example of a method for thermal mapping.

FIG. 4 is a flow diagram illustrating an example of a method 400 for thermal mapping. The method 400 and/or a method 400 step or steps may be performed by an electronic device. For example, the method 400 may be performed by the apparatus 356 described in connection with FIG. 3 (and/or by the 3D printing device 100 described in connection with FIG. 1).

The apparatus 356 may obtain 402 a map. A map is a set of image data for additive manufacturing. Examples of maps include shape maps, slice data, contone maps, etc. A shape map may indicate a shape or shapes (e.g., geometrical data) for additive manufacturing. For example, the apparatus 356 may generate a contone map or maps (e.g., fusing agent contone map and/or detailing agent contone map) based on 3D model data and/or slice data. The contone map may be at a voxel-level resolution in some examples. It should be note that a map (e.g., a shape map, slice data, etc.) at a voxel-level resolution may be utilized in addition to or alternatively from the contone map(s) described herein to calculate a predicted thermal image.

The apparatus 356 may obtain 404, for the layer, a first thermal image. For example, after the layer has been deposited, the apparatus 356 may obtain 404 a captured thermal image of the layer using a thermal image sensor or may receive a captured thermal image of the layer from a remote image sensor. The first thermal image (e.g., captured thermal image) may be at a low resolution.

The apparatus 356 may determine 406, using a neural network, a second thermal image at a second resolution based on the contone map and the first thermal image. The second resolution may be greater than the first resolution. In some examples, the contone map is at a voxel-level resolution, the first resolution is a low resolution, and the second resolution of the second thermal image is at the voxel-level resolution. For instance, the second resolution (e.g., 640× 480 pixels) may be greater than the first resolution (e.g., 80×60 pixels, 31×30 pixels, etc.) by a factor of at 8 or more in some implementations.

In some examples, the first thermal image corresponds to a first layer (e.g., k) and the second thermal image corresponds to the first layer (e.g., k). In some examples, the first thermal image corresponds to a first layer (e.g., k−1) and the second thermal image corresponds to a second layer (e.g., k) that is subsequent to the first layer.

In some examples, at least one neural network may utilize the contone map or maps (e.g., voxel-level machine instructions) and/or captured thermal image or images to calculate an enhanced thermal image. In some examples, the neural network is a recurrent neural network including one or multiple stacked convolutional long short-term memory networks.

In some examples, the apparatus 356 may increase the first resolution of the first thermal image to produce an upscaled first thermal image. For example, the apparatus 356 may upscale the first thermal image (e.g., low-resolution captured thermal image) using an empirical model, an interpolation-based approach, statistical approach, example-based approach, and/or thermal prediction intensity correction.

In some examples, the apparatus 356 may encode the upscaled first thermal image to produce first data that is provided to the neural network. In some examples, encoding the first thermal image is performed with a first neural network (e.g., a convolutional neural network). The apparatus 356 may encode the contone map to produce second data that is provided to the neural network. In some examples, encoding the contone map is performed with a second neural network (e.g., a convolutional neural network). The apparatus 356 may decode an output of the neural network to produce the second thermal image (e.g., enhanced thermal image). In some examples, decoding the output is performed with a third neural network.

In some examples, the apparatus 356 may concatenate the first data and the second data, where the first data is based on the first thermal image and the second data corresponds to the contone map. Concatenating the first and second data may include combining the feature layers. In an example, the dimensionality of the first data is 100*100*3 and the dimensionality of the second data is 100*100*3, where 100*100 is the image size and 3 is the number of feature layers. In this example, the concatenated data has a dimensionality of 100*100*6.

Figure 5:
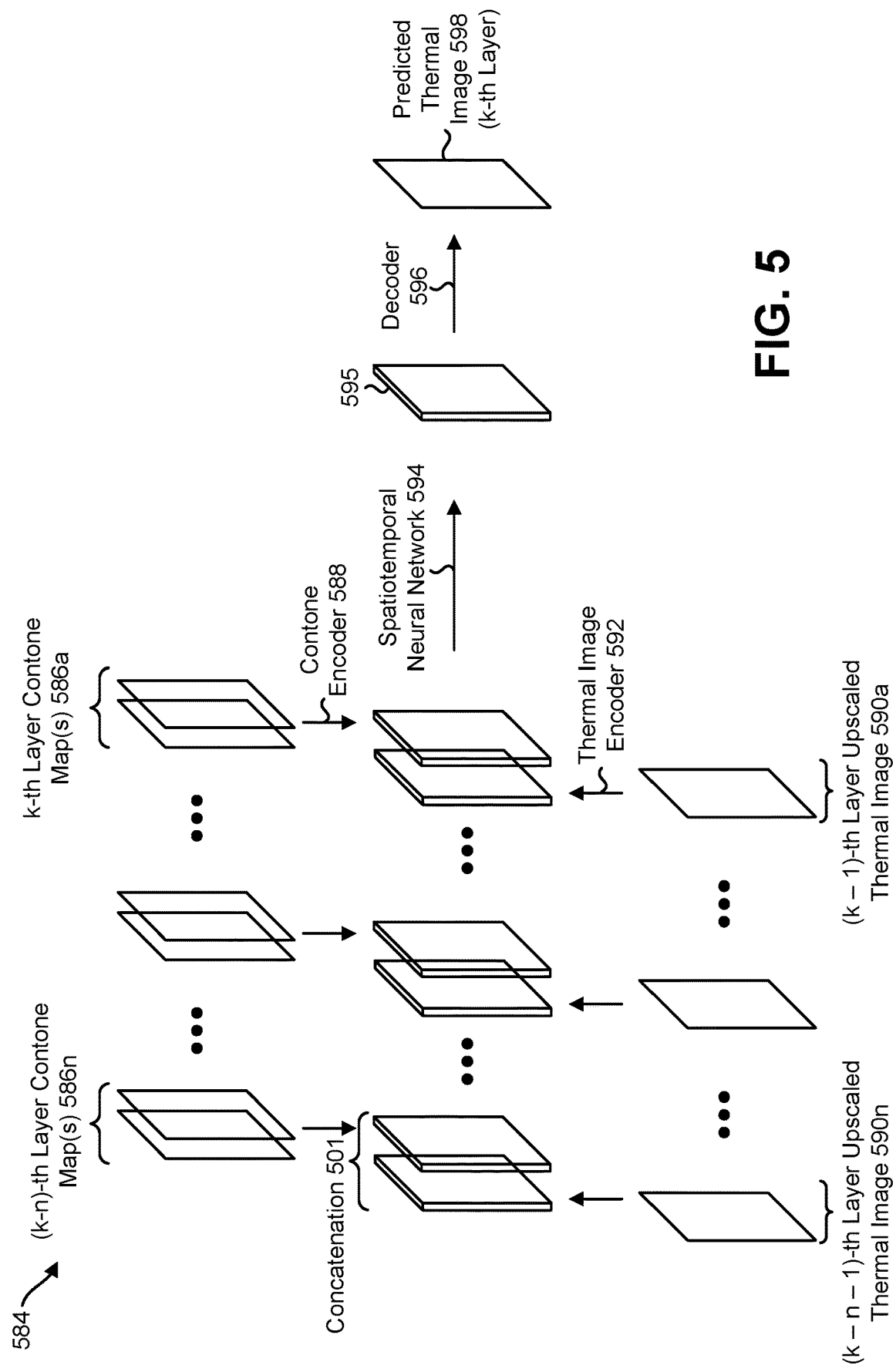
FIG. 5 is a diagram illustrating an example of a neural network architecture.

FIG. 5 is a diagram illustrating an example of a neural network architecture 584. The neural network architecture 584 described in connection with FIG. 5 may be an example of the neural networks described in connection with FIGS. 1-4. The neural network architecture 584 may take into account voxel-level thermal influencers to the fusing layer. A deep neural network with the neural network architecture 584 may learn spatiotemporal information, in recognition of two thermal influencers to the fusing layer thermal behavior: the energy absorption and/or loss driven by contone maps 586a-n, and the voxel-level thermal coupling both within a layer and among different layers. The network architecture 584 may include a spatiotemporal neural network 594. An example of a spatiotemporal neural network 594 is a recurrent neural network. In some examples, the spatiotemporal neural network 594 may include one or multiple (e.g., two or more) stacked Convolutional Long Short-Term Memory networks (Conv-LSTM). A Conv-LSTM is a type of recurrent neural network that overcomes numerical instability issues and takes spatial and temporal influence into account.

At each layer, the current layer contone maps (or data based on the contone maps) and a previous layer thermal image (or data based on the previous layer thermal image) may be utilized as input. For example, second data based on k-nth layer contone maps 586n may be concatenated 501 with first data based on a (k-n-1)-th layer upscaled thermal image 590n. Similarly, second data based on k-th layer contone maps 586a may be concatenated with first data based on a (k-1)-th layer upscaled thermal image 590a. Accordingly, the spatiotemporal neural network 594 may learn from the historical sequential information from both contone maps 586a-n and thermal images 590a-n.

The sequence of thermal images 590a-n may provide information regarding inter-layer thermal diffusion. The sequence of contone maps 586a-n may reflect energy application for each layer, and may also provide the material and/or phase information of previous layers. Accordingly, the sequence of contone maps 586a-n may help the spatiotemporal neural network 594 to learn heat flux behavior. Additionally, the sequence of contone maps 586a-n may provide voxel-level detail information, which may enable the spatiotemporal neural network 594 to infer an increased resolution (e.g., voxel-level) thermal image from the low-resolution thermal image.

In some examples, the following steps may be performed to calculate a predicted thermal image 598 of the k-th layer (e.g., the fusing layer): the k-th layer contone maps 586a may be passed through a contone encoder 588 and an upscaled thermal image 590a of the previous (k-1)-th layer (e.g., last buried layer) may be passed through a thermal image encoder 592 separately. It should be noted that the previous layer upscaled thermal image 590a may be based on a previous layer captured low-resolution thermal image. The thermal image encoder 592 may encode the (k-1)-th layer upscaled thermal image 590a to produce first data (e.g., features). The contone encoder 588 may encode the k-th layer contone maps 586a to produce second data (e.g., features).

The first data (e.g., features) and the second data (e.g., features) may be concatenated as the input to the spatiotemporal (e.g., Conv-LSTM) neural network 594. The output 595 for the k-th layer (at the current timestamp, for example) may be passed through a decoder 596 to produce the predicted thermal image 598 for the k-th layer (e.g., the fusing layer).

In some examples, the thermal image encoder 592 is a CNN, the contone encoder 588 is a CNN, and the decoder 596 is a CNN. For instance, the thermal image encoder 592, the contone encoder 588, and/or the decoder 596 may be a variety of CNNs combining different components, e.g., convolutional layers, pooling layers, de-convolutional layers, inception layers, residual layers, etc. The architectures of the thermal image encoder 592, the contone encoder 588, and/or the decoder 596 may be tuned experimentally. In some examples, inception module based CNNs may be utilized for the contone encoder 588, the thermal image encoder 592, and/or the decoder 596.

In some examples, built-in low-resolution thermal sensing may provide low-resolution thermal images. In some examples, the low-resolution thermal images may not be directly utilized. For example, upscaling (e.g., thermal prediction intensity correction) may be performed on the low-resolution thermal images to generate upscaled thermal images 590a-n. The upscaled thermal images 590a-n may be provided to the thermal image encoder 592. The features from the thermal image encoder 592 may be provided to the spatiotemporal neural network 594 as input.

The neural network architecture 584 may learn additional information from the sequence of contone maps 586a-n, and learn how to correct the current upscaled (e.g., voxel-level) thermal image 590a to produce a more accurate predicted (e.g., enhance, voxel-level) thermal image 598.

The neural network architecture 584 may achieve thermal image resolution enhancement and fusing layer thermal prediction concurrently because the neural network architecture 584 may be designed to learn the information required for both. Accordingly, some examples of the techniques and the neural network architecture 584 described, may avoid additional processing for increasing thermal image resolution while achieving enhanced thermal image prediction.

Figure 6:
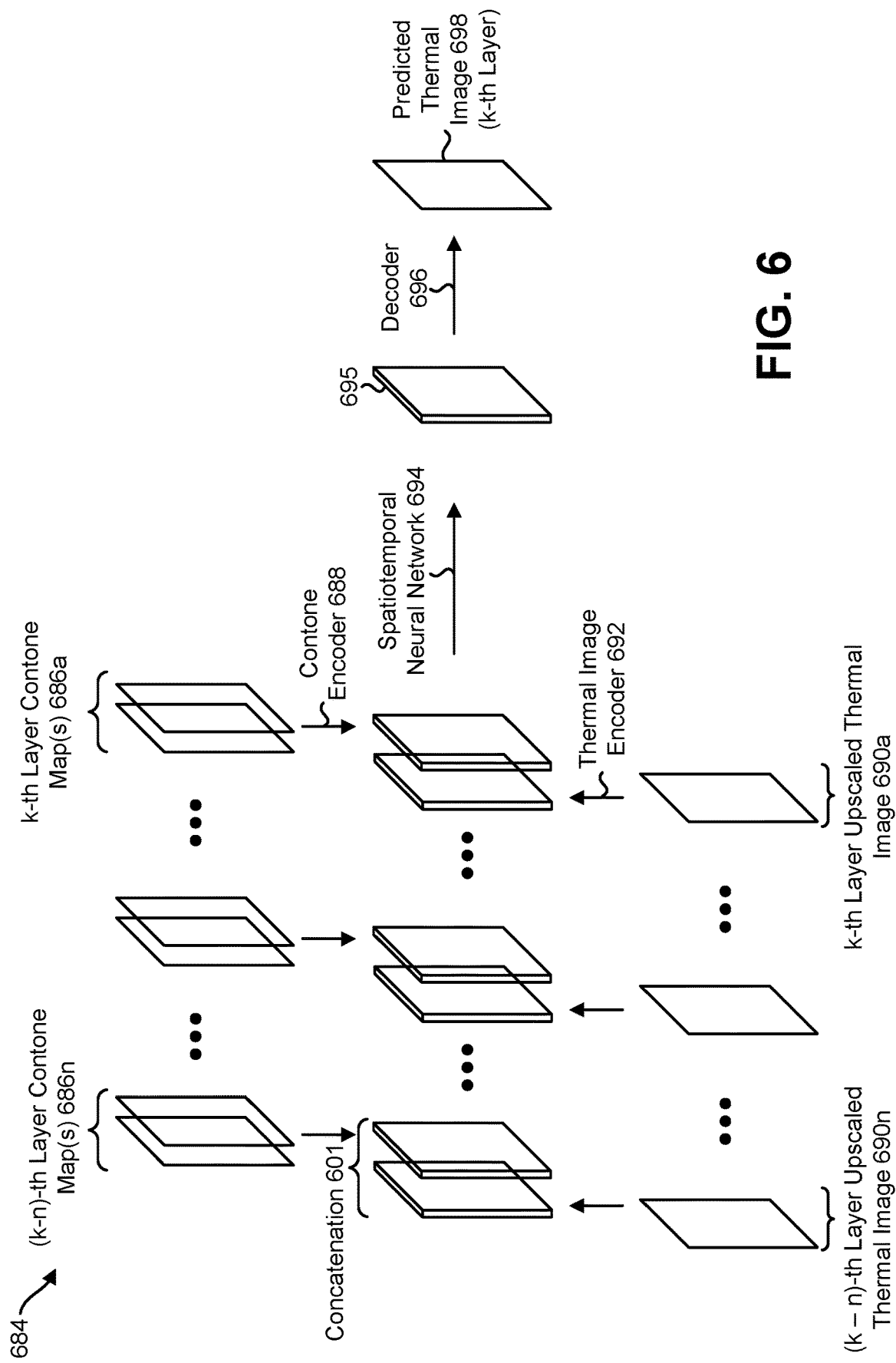
FIG. 6 is a diagram illustrating another example of a neural network architecture.

FIG. 6 is a diagram illustrating another example of a neural network architecture 684. The neural network architecture 684 described in connection with FIG. 6 may be an example of the neural networks described in connection with FIGS. 1-4. In this example, a low-resolution (e.g., 31×30 pixels, etc.) thermal image may be enhanced to a high-resolution (e.g., voxel-level, 640×480 pixels, etc.) thermal image. The image may be enhanced by a factor (e.g., greater than or equal to 8, approximately 20, etc.). In some examples, 400 pixels may be predicted from one low-resolution image pixel, which is difficult to achieve with accuracy in other approaches. In some of the techniques described herein, additional information may be utilized to infer the 400 pixels per one low-resolution pixel, for example.

In some examples, the additional information may include a sequence of contone maps 686a-n (e.g., fusing agent contone map and/or detailing agent contone map), and a sequence of captured thermal images 690a-n. For example, two thermal influencers to the fusing layer may include a sequence of previous thermal images, which drive heat transfer, and a sequence of fusing agent and detailing agent contone maps, which drive the layer energy application. This information may help to infer the thermal behavior of the current layer. In some examples, sequence of contone maps 686a-n may be high-resolution (e.g., voxel-level) images and may reflect the material phases, which may provide the voxel-level information to infer the thermal voxels. Accordingly, some of the techniques described herein may be based on a deep neural network for voxel-level thermal prediction with built-in low-resolution thermal sensing, to produce enhance resolution thermal images.

The neural network architecture 684 may be utilized to predate a high-resolution (e.g., voxel-level) thermal image of a current layer k. At each layer, the layer contone maps (or data based on the contone maps) and a layer thermal image (or data based on the current layer thermal image) may be utilized as input. For example, second data based on (k-n)-th layer contone maps 686n may be concatenated 601 with first data based on a (k-n)-th layer upscaled thermal image 690n. Similarly, second data based on k-th layer contone maps 686a may be concatenated with first data based on a k-th layer upscaled thermal image 690a. Accordingly, the spatiotemporal neural network 694 may learn from the historical sequential information from both contone maps 686a-n and thermal images 690a-n.

In some examples, the following steps may be performed to calculate a predicted thermal image 698 of the k-th layer (e.g., the fusing layer): the k-th layer contone maps 686a may be passed through a contone encoder 688 and an upscaled thermal image 690a of the k-th layer may be passed through a thermal image encoder 692 separately. It should be noted that this aspect of this example may differ from the example described in connection with FIG. 5.

It should be noted that the upscaled thermal image 690a may be based on a captured low-resolution thermal image. The thermal image encoder 692 may encode the k-th layer upscaled thermal image 690a to produce first data (e.g., features). The contone encoder 688 may encode the k-th layer contone maps 686a to produce second data (e.g., features).

The first data (e.g., features) and the second data (e.g., features) may be concatenated as the input to the spatiotemporal (e.g., Conv-LSTM) neural network 694. The output 695 for the k-th layer (at the current timestamp, for example) may be passed through a decoder 696 to produce the predicted thermal image 698 for the k-th layer.

The network architecture 684 may include a spatiotemporal neural network 694. An example of a spatiotemporal neural network 694 is a recurrent neural network. In some examples, the spatiotemporal neural network 694 may include one or multiple stacked Conv-LSTM networks. A Conv-LSTM is a type of recurrent neural network that overcomes numerical instability issues.

It should be noted that while the neural network architecture 684 of FIG. 6 has some similarity with the neural network architecture 584 of FIG. 5, the detailed architecture, including the spatiotemporal neural network 694 (e.g., Conv-LSTM), the contone encoder 688, and the decoder 696, are not necessarily the same architecture as that described in connection with FIG. 5. The input components may play different roles in the modeling due to different objectives. In some approaches, the specific architecture may be tuned experimentally. In some examples, the thermal image encoder 692 is a CNN, the contone encoder 688 is a CNN, and the decoder 696 is a CNN. For instance, the thermal image encoder 692, the contone encoder 688, and/or the decoder 696 may be a variety of CNNs combining different components, e.g., convolutional layers, pooling layers, de-convolutional layers, inception layers, residual layers, etc. The architectures of the thermal image encoder 692, the contone encoder 688, and/or the decoder 696 may be tuned experimentally. In some examples, inception module based CNNs may be utilized for the contone encoder 688, the thermal image encoder 692, and/or the decoder 696.

In some examples, low-resolution thermal sensing may provide low-resolution thermal images. In some examples, the low-resolution thermal images may not be directly utilized. For example, upscaling (e.g., thermal prediction intensity correction) may be performed on the low-resolution thermal images to generate upscaled thermal images 690a-n. The upscaled thermal images 690a-n may be provided to the thermal image encoder 692. The features from the thermal image encoder 692 may be provided to the spatiotemporal neural network 694 as input.

Providing an upscaled (e.g., voxel-level) thermal image instead of the original low-resolution thermal image may be a beneficial approach to synthesize the additional information and improve inference of the enhanced thermal voxels. For example, the thermal prediction intensity correction may utilize a simple thermal prediction for resolution enhancement, which may provide detailed information. While the upscaled thermal image itself may not provide enough accuracy at the voxel-level in some examples, the upscaled thermal image may achieve some accuracy at a resolution level higher than the low-resolution thermal sensing, making resolution enhancement easier. This may be beneficial since deep neural networks that could directly enhance the thermal images by a factor of 20 (e.g., a de-convolutional NN) may require a large number of parameters, which may make model training and tuning extremely difficult. Instead, using the upscaled thermal image and training a model to correct the voxel level value may require significantly fewer parameters and a simpler network. Accordingly, some examples of the neural network architecture 684 may be beneficial to enhance thermal image resolution. For example, the neural network architecture 684 may make use of physical behavior information may be designed for thermal images specifically.

Due to the additional information extraction and inference from the sequence of contone maps 686a-n and upscaling (e.g., thermal prediction intensity correction), the neural network architecture 684 may achieve thermal image resolution enhancement by a factor of 20. Accordingly, some examples of the techniques described herein may achieve a degree of image resolution enhancement that is much greater than that of other approaches for increasing image resolution.

Figure 7:
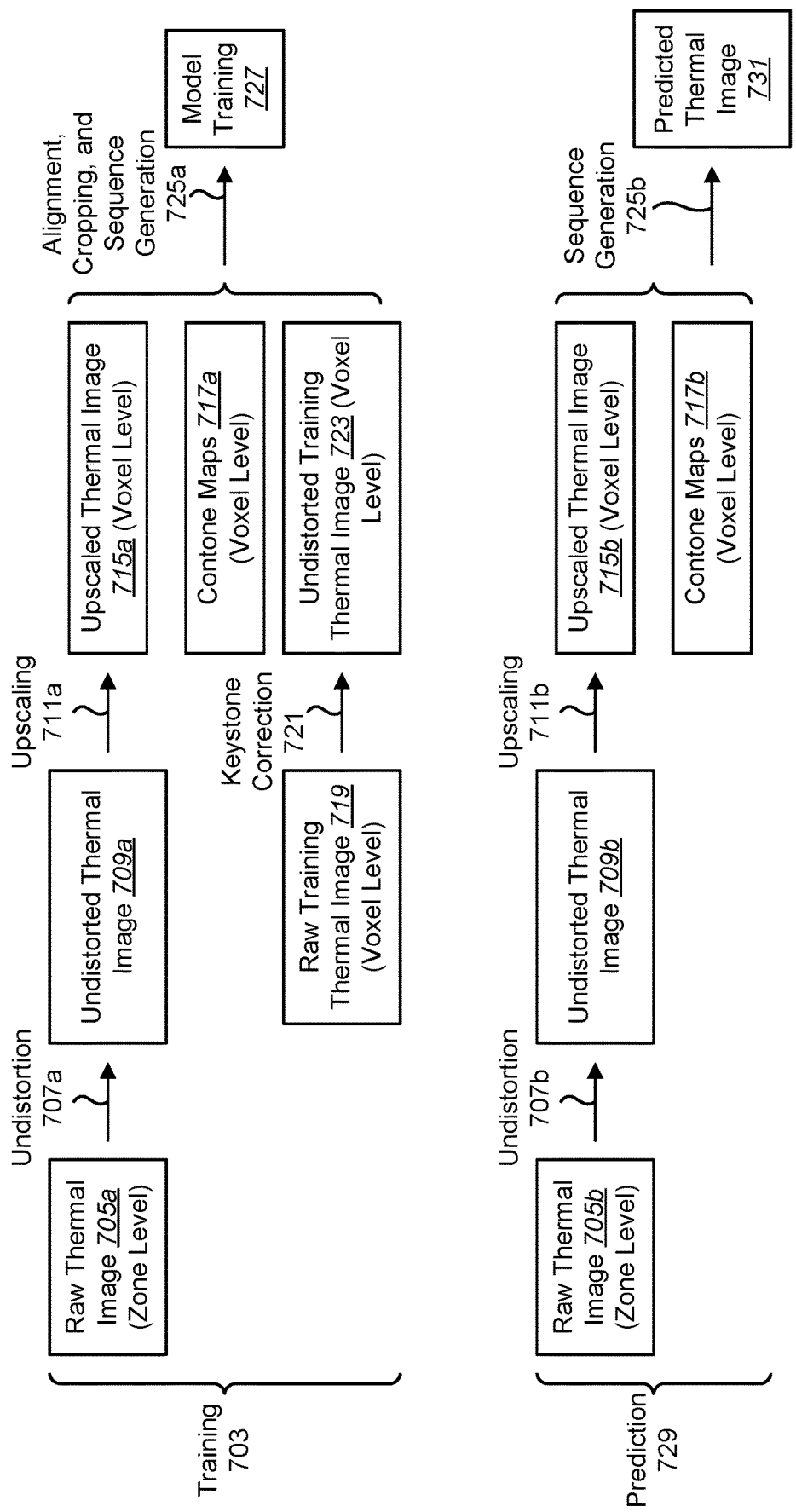
FIG. 7 is a block diagram illustrating examples of neural network training and prediction.

FIG. 7 is a block diagram illustrating examples of neural network training 703 and prediction 729. Some examples of the neural networks described herein may be trained and/or may perform prediction in accordance with the examples described in connection with FIG. 7.

Training 703 may include obtaining low-resolution raw thermal image(s) 705a, high-resolution (e.g., voxel-level) raw training thermal image(s) 719, and contone maps 717a (e.g., voxel-level contone maps) from a printer data pipeline. Undistortion 707a may be applied to the raw thermal image(s) 705a to produce undistorted thermal image(s) 709a. For example, the raw thermal images 705a may be captured with a fisheye lens, and the undistortion 707a may remove distortion resulting from the fisheye lens. Upscaling 711a (e.g., thermal prediction intensity correction) may be applied to the undistorted thermal image(s) 709a to produce upscaled (e.g., voxel-level) thermal image(s) 715a. Keystone correction 721 may be applied to the raw training thermal image(s) 719 to produce undistorted training thermal image(s) 723 (at the voxel level, for example).

The upscaled thermal image 715a and the contone maps 717a (e.g., fusing agent contone map and/or detailing agent contone map) may be fed as input into the neural network with alignment, cropping, and sequence generation 725a for model training 727. The undistorted training thermal image(s) 723 may be utilized as ground truth data for model training 727.

A similar procedure may be utilized in prediction 729 (e.g., while online, during run-time, etc.). For example, low-resolution raw thermal image(s) 705b and contone maps 717b (e.g., voxel-level contone maps) may be obtained from a printer data pipeline. Undistortion 707b may be applied to the raw thermal image(s) 705b to produce undistorted thermal image(s) 709a. Upscaling 711b (e.g., thermal prediction intensity correction) may be applied to the undistorted thermal image(s) 709b to produce upscaled (e.g., voxel-level) thermal image(s) 715b.

The upscaled thermal image 715b and the contone maps 717b (e.g., fusing agent contone map and/or detailing agent contone map) may be fed as input into the neural network with sequence generation 725b to produce predicted (e.g., enhanced) thermal image(s) 731. For example, the trained neural network may calculate the high-resolution (e.g., voxel-level) predicted thermal image(s) 731. No training thermal image may be utilized in prediction 729.

Figure 8:
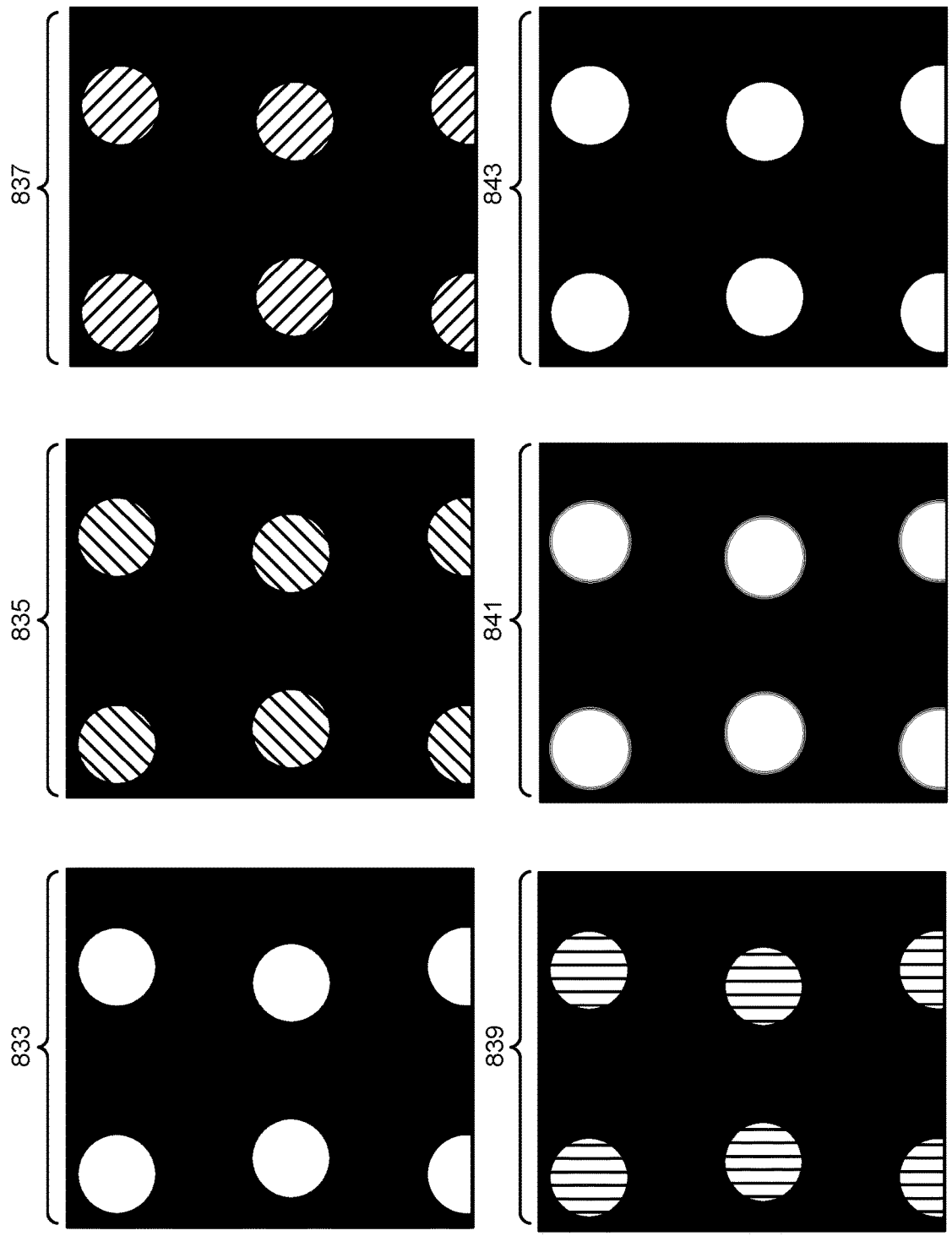
FIG. 8 includes images illustrating an example of thermal mapping.

FIG. 8 includes images illustrating an example of thermal mapping. Each of the images corresponds to a single layer. The top left image is an example of a fusing contone map 833. The top middle image is an example of a detailing contone map 835. The top right image 837 is a high-resolution (e.g., voxel-level) thermal image (e.g., ground truth). The bottom left image is an example of an approach for simple thermal prediction 839 using an empirical model. The bottom middle image is an upscaled thermal image 841 generated from thermal intensity correction. The bottom right image is a predicted image 843 in accordance with some of the techniques disclosed herein.

This example demonstrates that some examples of the neural network architecture described herein may effectively achieve the voxel-level fusing layer (e.g., upcoming layer) thermal prediction that is approximately 20 times the thermal sensing resolution. The neural network architecture may effectively capture the thermal behavior of energy application driven by contone maps and inter-layer thermal diffusion. This example also illustrates that some of the techniques described herein may overcome a blurring effects introduced by thermal intensity correction, which demonstrates improved accuracy.

Figure 9:
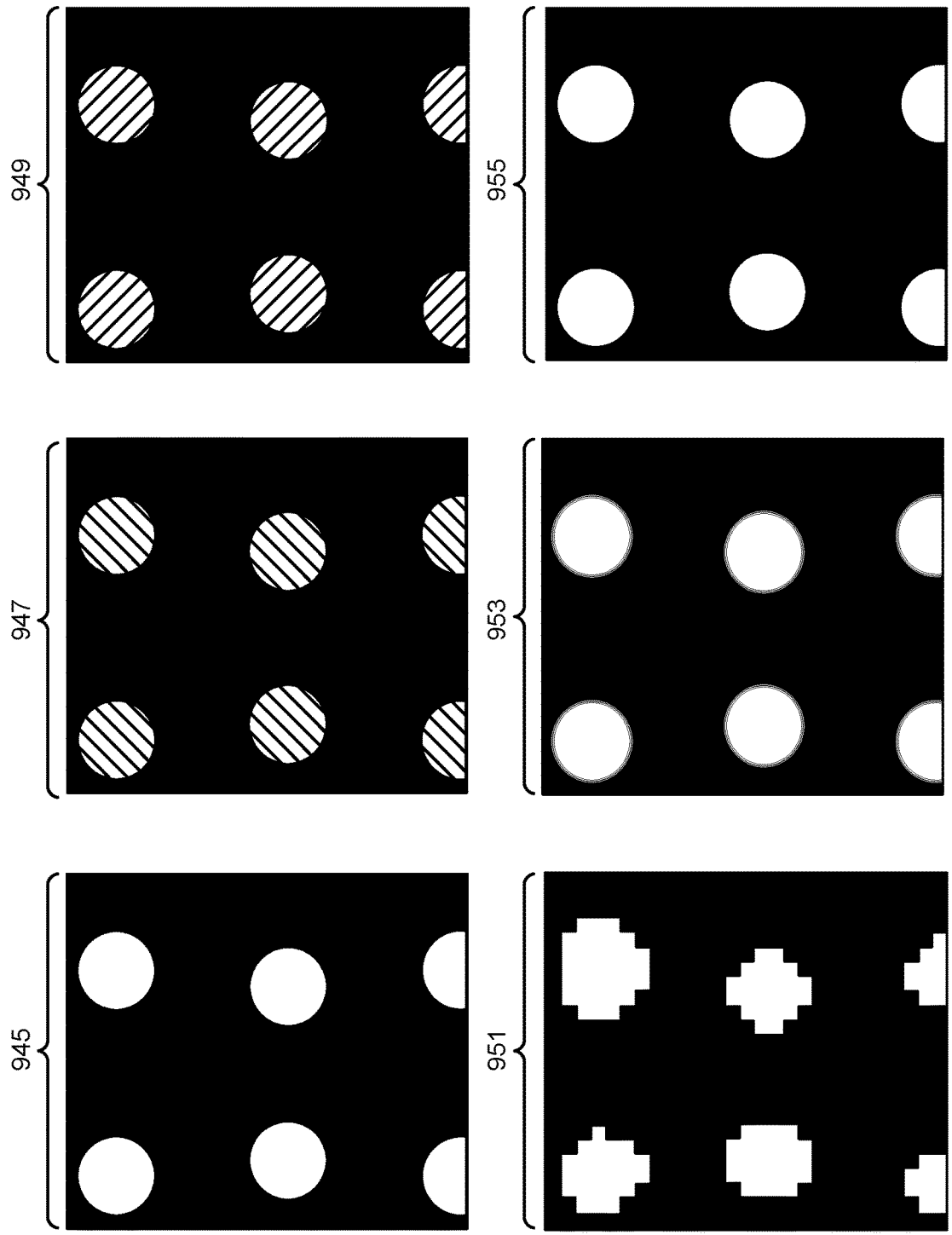
FIG. 9 includes images illustrating another example of thermal mapping.

FIG. 9 includes images illustrating another example of thermal mapping. Each of the images corresponds to a single layer. The top left image is an example of a fusing contone map 945. The top middle image is an example of a detailing contone map 947. The top right image 949 is a high-resolution (e.g., voxel-level) thermal image (e.g., ground truth). The bottom left image is a low-resolution captured thermal image 951. The bottom middle image is an upscaled thermal image 953 generated from thermal intensity correction. The bottom right image is a predicted image 955 in accordance with some of the techniques disclosed herein. This example demonstrates that some examples of the neural network architecture described herein may effectively achieve the voxel-level thermal resolution enhancement that is approximately 20 times the thermal sensing resolution.

It should be noted that while various examples of systems and methods are described herein, the disclosure should not be limited to the examples. Variations of the examples described herein may be implemented within the scope of the disclosure. For example, steps, functions, aspects, or elements of the examples described herein may be omitted or combined.

The invention claimed is:

1. A method for thermal mapping for additive manufacturing by an electronic device, comprising:
    obtaining a two-dimensional contone map, at a voxel-level resolution, for additive manufacturing;
    obtaining a first thermal image at a first resolution; and
    calculating, using a neural network, a second thermal image at a second resolution based on the two-dimensional contone map and the first thermal image, wherein the second resolution is at the voxel-level resolution and greater than the first resolution.

2. The method of claim 1, further comprising concatenating first data and second data, wherein the first data is based on the first thermal image and the second data corresponds to the map or a plurality of maps.

3. The method of claim 1, wherein the neural network is a recurrent neural network comprising a convolutional long short-term memory network or multiple stacked convolutional long short-term memory networks.

4. The method of claim 1, further comprising increasing the first resolution of the first thermal image to produce an upscaled first thermal image.

5. The method of claim 4, further comprising: encoding the upscaled first thermal image to produce first data that is provided to the neural network; encoding the map to produce second data that is provided to the neural network; and decoding an output of the neural network to produce the second thermal image.

6. The method of claim 5, wherein the encoding the first thermal image is performed with a first neural network, the encoding the map is performed with a second neural network, and the decoding the output is performed with a third neural network.

7. The method of claim 1, wherein the second resolution is greater than the first resolution by a factor of at least 8.

8. The method of claim 1, wherein the first thermal image corresponds to a first layer and the second thermal image corresponds to the first layer, wherein the second thermal image is an enhanced voxel-level thermal image of the first layer.

9. The method of claim 1, wherein the first thermal image corresponds to a first layer and the second thermal image corresponds to a second layer that is subsequent to the first layer, wherein the second thermal image is a predicted voxel-level thermal image calculated before forming the second layer, and wherein the method further comprises performing feedback control based on the second thermal image.

10. A three-dimensional (3D) printing device, comprising:
- a print head to print a fusing agent based on a two-dimensional fusing contone map at a voxel-level resolution and to print a detailing agent based on a detailing contone map;
- a thermal projector;
- a thermal sensor; and
- a controller, wherein the controller is to:
    - receive a captured thermal image of a first layer from the thermal sensor, wherein the captured thermal image is at a first resolution; and
    - predict, using a neural network based on the two-dimensional fusing contone map,
        - the detailing contone map, and the captured thermal image,
            - a predicted thermal image of a second layer that is subsequent to the first layer, wherein the predicted thermal image is at a second resolution that is at the voxel-level resolution and greater than the first resolution.

11. The 3D printing device of claim 10, wherein the controller is to:
- upscale the captured thermal image to produce an upscaled thermal image;
- encode, using a first convolutional neural network, the upscaled thermal image to produce first data;
- encode, using a second convolutional neural network, the fusing contone map and the detailing contone map to produce second data; and
- concatenate the first data with the second data to produce concatenated data, wherein the concatenated data is input to the neural network.

12. The 3D printing device of claim 11, wherein the controller is to decode, using a third convolutional neural network, an output of the neural network to produce the predicted thermal image.

13. A non-transitory tangible computer-readable medium storing executable code, comprising:
- code to cause a processor to obtain a two-dimensional fusing contone map, at a voxel-level resolution, for additive manufacturing, and a detailing contone map corresponding to a layer;
- code to cause the processor to obtain a captured thermal image corresponding to the layer; and
- code to cause the processor to enhance the captured thermal image using a neural network based on the two-dimensional fusing contone map, the detailing contone map, and the captured thermal image to produce an enhanced thermal image with an increased resolution relative to a resolution of the captured thermal image, whereby the increased resolution is at the voxel-level resolution.

14. The computer-readable medium of claim 13, further comprising code to train the neural network using a set of training thermal images with a second resolution that is greater than the resolution of the captured thermal image.

* * * * *